Patented May 28, 1940

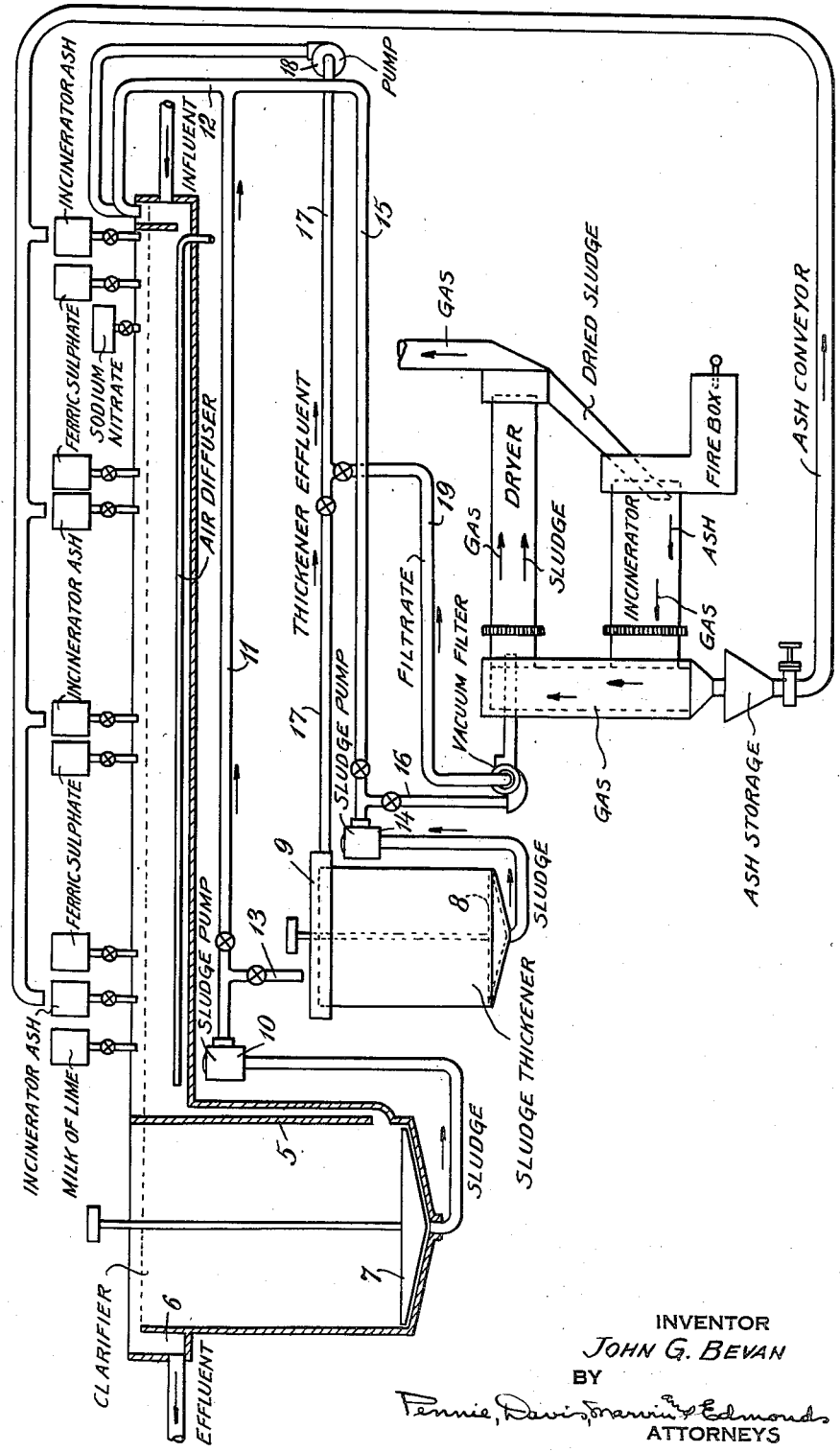

2,202,135

UNITED STATES PATENT OFFICE 2,202,135

TREATING SEWAGE

John G. Bevan, New York, N. Y., assignor to Guggenheim Brothers, New York, N. Y., a co-partnership Application April 6, 1935, Serial No. 15,011

1 Claim. (Cl. 210—2)

This invention relates to sewage treatment and has for an object the provision of an improved process for treating sewage and similar waste liquors. More particularly, the invention contemplates the provision of an improved process for removing putrescible matter from sewage and similar waste liquors. The invention further contemplates the provision of a process for treating sewage involving the use of sludge obtained during the course of the process in conjunction with incinerator ash obtained by incinerating sewage sludge produced in the treatment of sewage with a metal compound. A further object of the invention is to provide a sewage method or process which may be carried out more smoothly to produce more uniform results than can be produced by means of heretofore customary processes. The invention also contemplates the provision of improvements in conditioning sewage or sewage sludge or both to provide for improved settling and improved filtration. The invention can be employed advantageously in the first stage of the sewage treating process described in the United States patent to Gleason and Loonam, No. 1,886,267 of November 1, 1932.

In ordinary raw sewages and similar waste liquors, putrescible matter, consisting of carbon, hydrogen, sulphur, etc. in various combinations, is present in two forms, namely; (1) insoluble (suspended matter), (2) soluble. In any sewage treating operation, it is customary to remove the coarser and heavier insoluble matter by screening. After screening, the concentration of the insoluble putrescible matter remaining in the sewage is extremely low, for example, an average municipal sewage contains around 150 to 200 parts per million of dispersed or finely divided solid matter largely in colloidal suspension. This finely divided putrescible matter includes simple and complex compounds resulting from the breaking down of proteins.

The amount and character of putrescible matter in sewage from any locality varies according to the time of the day or night and according to the season of the year. These variations in the amount and character of putrescible matter cause operating difficulties in sewage treatment plants. A sewage treatment process of a type employed heretofore may be adjusted to produce desired results and operate satisfactorily for a considerable period of time, and suddenly or gradually the results may become very erratic. The change in the character of the results is probably attributable to change in the character of the sewage but the cause is difficult or impossible to determine, and, therefore, it is difficult or impossible properly to adjust the process while the changed character of the sewage persists. These difficulties are encountered in sewage treatment processes of all types, whether of the purely sedimentation type, activated sludge type or chemical precipitation type, and in sewage treatment processes involving various combinations of features of sedimentation, activated sludge and chemical precipitation processes.

I have discovered that such difficulties, which probably are attributable to changes in the character of sewage, can be eliminated to a large extent by the addition to the sewage undergoing treatment of a nitrate such as sodium nitrate or a nitrate and an alkaline agent such as lime. The addition of sodium nitrate, or sodium nitrate and lime, to sewage undergoing treatment causes a smoother operation and results in the production of more uniform results.

The addition of sodium nitrate or sodium nitrate and lime to sewage undergoing treatment improves settling and results in the production of a thicker and more easily filterable sludge. The addition of lime, sodium nitrate, sodium nitrate and lime, or sodium nitrate and an acid substance such as sulphuric acid to sludge causes the sludge to filter more rapidly. Normal sludge obtained in carrying out heretofore customary processes contains about six percent of solids and rarely more than ten percent of solids. Sludges produced in processes in which sodium nitrate or sodium nitrate and lime have been added to the sewage undergoing treatment usually contain more than ten percent of solids and frequently contain as much as sixteen per cent of solids.

The nitrate or the nitrate and alkaline agent may be added to the sewage undergoing treatment either continuously or only intermittently when required by variation in uniformity of results. Lime or nitrate or lime and nitrate or nitrate and an acid substance may be added to the sludge continuously or intermittently to condition the sludge for filtering. Lime or nitrate or lime and nitrate or nitrate and an acid substance are preferably added to the sludge when no additions of such substances have been made to the sewage undergoing treatment, but additions may be made to the sewage undergoing treatment and to the sludge as well.

A nitrate such as sodium nitrate is preferably added to sewage undergoing treatment in amounts equivalent to about 50 to 100 pounds of sodium nitrate for each one million gallons of sewage. When a nitrate and an alkaline agent are added to sewage undergoing treatment, the nitrate and alkaline agent are preferably added in equal amounts. The nitrate and alkaline agent may be added to the sewage at any stage of the sewage treatment process, but the nitrate is preferably added near the commencement or even prior to the commencement of the treatment process, and the alkaline agent is preferably added within 5 to 10 minutes of the end of the treatment process.

In the conditioning of sludges from chemical precipitation processes the addition of a nitrate alone may effect suitable conditioning, but usually it is advisable to employ a nitrate and an alkaline agent in substantially equal amounts, and in some cases, it may be advisable to add a soluble iron compound or an acid with the nitrate. In the conditioning of activated sludge, it is usually advisable to add an acid substance with the nitrate. For sludges from chemical precipitation processes, 50 pounds of sodium nitrate and 50 pounds of lime will usually effect satisfactory conditioning of sludge obtained from treatment of a million gallons of sewage. One ton of sodium nitrate and one ton of sulphuric acid (as $H_2SO_4$) will usually effect satisfactory conditioning of a million gallons of sludge from an activated sludge process. Nitrate, alkaline agent and acid should be added to sewages and sludges in proportions required by the characteristics of the sewages and sludges. Suitable proportions may be determined in each case by simple tests, as, for example, by simply observing the results produced by the use of various amounts.

I have also discovered that removal of putrescible matter from sewage is promoted by aerating the sewage in the presence of incinerator ash, obtained by incinerating sludge produced in a sewage treatment process in which a metal compound is added to the sewage, and a quantity of sludge produced or recovered during the course of the process. Incinerator ash may be obtained by incinerating sludge from any suitable type of processes. Among the processes which produce sludge which can be incinerated to produce incinerator ash for use in the process of the present invention are the process of the United States patents to Gleason and Loonam Nos. 1,886,267 and 1,956,420 and the processes of my co-pending applications Serial No. 738,781, filed August 7, 1934 (Patent No. 2,021,679); Serial No. 759,450, filed December 28, 1934; and Serial No. 759,451, filed December 28, 1934. Incinerator ash obtained by incinerating sludge obtained in carrying out the process of the present invention may also be employed.

The incinerator ash may be employed in any suitable manner. Thus, for example, a portion of the sewage may be subjected to the action of a soluble metal compound, such, for example, as ferric sulphate or any other compound referred to in my aforementioned co-pending applications, and another portion of the sewage may be subjected to the action of incinerator ash obtained by incinerating sludge produced in such a process; or the incinerator ash may be employed in conjunction with a soluble metal compound in the treatment of a single batch or flow of sewage. When the incinerator ash is employed in conjunction with a soluble metal compound in the treatment of a single batch or flow of sewage, the incinerator ash and the soluble metal compound may be employed at the same time or alternately. Thus, for example, the sewage may be treated for a suitable period of time with a soluble metal compound. During this period, excess sludge (over and above that returned to the process) may be withdrawn continuously and incinerated. When a suitable amount of incinerator ash has accumulated, treatment with the soluble metal compound may be discontinued, and treatment with incinerator ash commenced and continued as long as an adequate supply is available. If the incinerator ash and the soluble metal compound are employed at the same time, the excess sludge may be withdrawn and incinerated continuously to maintain an adequate supply of incinerator ash. In employing incinerator ash and a soluble metal compound at the same time, it is advisable to employ the soluble metal compound in an amount sufficient to make up for all losses in the system and maintain a substantially constant supply of incinerator ash. In preparation for carrying out a process in which incinerator ash and a soluble metal compound are employed together, it may be advisable to dispense with the use of incinerator ash and employ a soluble metal compound alone until an adequate supply of incinerator ash has accumulated; or the incinerator ash may be employed in relatively small amount at first, and the amount increased (with a corresponding decrease in the amount of soluble metal compound) until the desired proportions of incinerator ash and soluble metal compound are established.

When the incinerator ash and the soluble metal compound are employed for treating a single batch or flow of sewage, they may be added together or separately, and when added separately either may be added first and the separated additions may be spaced at any suitable intervals.

In a preferred complete process of the invention, sewage is aerated in the presence of a metal compound and returned sludge and the returned sludge is added to the sewage at the commencement of the aerating treatment or shortly after the raw sewage enters the aeration vessel. The soluble metal compound may be added to the sewage at any desired stage of the aerating treatment. When ferric sulphate is employed, it is preferably added to the sewage during the course of its aeration within about two to fifteen minutes prior to the completion of the aerating treatment. Aluminum sulphate and aluminum chloride also are preferably added within about two to fifteen minutes prior to the completion of the aeration treatment. Ferrous sulphate is preferably added to the sewage within about ten to thirty minutes before the end of the aeration treatment.

Incineraor ash may be added at the same time as the soluble iron or aluminum compound or addition of the soluble iron or aluminum compound may be discontinued while the incinerator ash is being added. The time of addition of incinerator ash containing iron oxide or aluminum oxide may correspond substantially with the time of addition of iron or aluminum sulphate.

Good results may be obtained if the period of aeration following the addition of ferric sulphate or aluminum sulphate separately or in conjunction with incinerator ash is just sufficient to permit thorough dissemination of the ferric sulphate or aluminum sulphate and the incinerator ash. The period of aeration may be varied considerably. Good results may be obtained if aeration is carried out for a period of about one-half hour or less, and little or no additional advantage may be gained by continuing aeration for a period of time longer than about one hour.

A soluble nitrate may be added to the sewage or not as desired, or as required by conditions, but, if added, it is preferably added at the commencement of the aeration treatment.

If the pH of the sewage is 7 or lower near the end of the aeration period and it is desired to increase the pH to a value above 7, an amount of an alkaline agent such as lime sufficient to increase the pH to the desired value may be added prior to the completion of the aeration treatment. Usually, it will not be necessary or desirable to adjust the pH of the sewage by the addition of an alkaline agent, as I have found that highly satisfactory precipitation, settling and clarification can be obtained even when the pH is considerably below 7. If the addition of an alkaline agent is desired or required for any purpose, it is preferably added after the soluble metal compound and/or acid-treated sludge has been added and thoroughly disseminated throughout the sewage. Following the aeration treatment, the sewage is introduced into a clarifier underneath a layer or blanket of settling sludge so that the liquor flows upwardly through the sludge blanket and overflows from the clarifier with a practically negligible amount of suspended matter.

In carrying out the process of the invention in its preferred and complete form, the raw sewage, after appropriate screening is mixed with returned sludge in an aeration vessel and aeration of the mixture is commenced. The aeration vessel employed is preferably of the type which permits a continuous flow of the mixture undergoing treatment from an entrance end to a discharge end and the rate of flow is preferably controlled to provide a period of about one hour between the time of entry and the time of discharge of the sewage. Aeration of the sewage is preferably continued throughout its entire period of detention in the aeration vessel.

As the mixture undergoing treatment is flowing through the aeration vessel, a soluble iron compound, preferably in the form of a ferric sulphate solution of 50 grams per liter concentration and a quantity of incinerator ash (obtained by incinerating sludge from a process involving the use of ferric sulphate) are added to the mixture at a point corresponding to an interval of about 2 to 15 minutes before the time of discharge of the mixture from the vessel. Prompt diffusion of the solution and the incinerator ash throughout the mixture is produced by the agitation resulting from aeration. The oxygen in the air keeps the iron in the ferric condition. When a ferrous salt such as ferrous sulphate is employed, the oxygen of the air converts the iron to the ferric condition.

The incoming raw sewage ordinarily has a pH of around 7 to 7.5. In the coagulating treatment, the trivalent metal ions are precipitated, probably in the form of ferric hydroxide as well as in the form of simple and complex organic ferric compounds. The sulphate ions of the added ferric sulphate tend to lower the pH of the sewage to a value below 7, but this tendency is largely counteracted by the effects of the aeration and the returned sludge, and the sewage at the conclusion of the ferric sulphate and incinerator ash treatment may have a pH equivalent to that of the incoming raw sewage. Substantially all the iron added as ferric sulphate is precipitated, and it appears that this precipitated iron together with the iron returned with the sludge and the iron of the incinerator ash forms a blanket which acts as a collector of suspended matter. The returned sludge and the aeration treatment also aid in effecting precipitation of the suspended matter. Also, aeration of the sewage causes oxidation of a considerable amount of the dissolved putrescible matter.

The total amount of iron added to the sewage (as an iron salt or solution and in the incinerator ash) depends to some extent at least, upon the amount of suspended putrescible matter in the sewage. In the treatment of the average municipal sewages, a total of 55 to 75 parts per million of added iron (all in incinerator ash, or 5 to 10 parts soluble and balance in incinerator ash) produce satisfactory coagulation and precipitation of the suspended solids. In the treatment of industrial waste liquors such, for example, as dairy plant and packing plant waste liquors, a total of 75 to 100 parts per million of iron (all in incinerator ash, or 5 to 15 parts soluble and balance in incinerator ash) may be required to produce satisfactory coagulation and precipitation of suspended solids. Satisfactory aeration is obtained with from 0.01 to 0.1 cubic foot of air per gallon of sewage treated. It appears that the oxygen of the air employed for aeration functions chiefly to oxidize putrescible matter and is not absorbed by the sludge. This is indicated by rapid elimination of dissolved putrescible matter and the presence of dissolved oxygen in the clarifier overflow.

If adjustment of the pH is desirable following the treatment with ferric sulphate, the sewage may be treated in the presence of an alkaline agent, such as lime, in amount sufficient to give a pH of the desired value. Adjustment of the pH to a value above 7 may sometimes improve settling and filtration. Lime is preferable to other alkaline agents for this operation because it gives a denser floc and one which settles very rapidly, and because it is inexpensive. Lime is preferably added to the sewage as milk of lime in 50 grams per liter concentration. Where dissolved putrescible matter is to be subsequently removed from the sewage liquor by a base exchange (zeolite) treatment, it is preferable to carefully regulate the amount of lime added to the sewage to give a pH of about 7.2 to 7.6.

Following the treatment with lime, the sewage passes to a clarifier, into which it is introduced near the bottom, passing upward through a blanket of settling sludge. Clarified liquor overflows and settled sludge is removed from the bottom of the clarifier, preferably being raked or otherwise mechanically worked along the bottom of the clarifier towards the sludge discharge outlet. The supernatant liquor is substantially free from suspended matter and may advantageously be subjected to a base exchange treatment as described in the aforementioned patent to Gleason and Loonam No. 1,886,267.

The sludge from the bottom of the clarifier may be conducted in part to a thickener and in part to the aeration vessel. Clarified liquor overflows and settled sludge is removed from the bottom of the thickener. The clarifier and thickener effluents may be combined for appropriate disposal or for subsequent treatment, but the thickener effluent is preferably returned to the aeration vessel for further treatment. The sludge from the thickener, containing about 3% to 10% solids, may be conducted in part to the aeration vessel and in part to a suction filter where its moisture content is reduced. The filtrate or effluent from the filter is preferably returned to the aeration vessel for retreatment. All of the sludge returned to the aeration vessel may be obtained from the clarifier, all may be obtained from the thickener or a portion may be obtained from the thickener and a portion from the clarifier. About 20 to 75%, more or less, of the sludge is returned to the aeration vessel. The amount of sludge returned may vary considerably. Ordinarily, sludge return may be controlled advantageously to establish in the sewage-sludge mixture undergoing treatment in the aeration vessel an amount of suspended matter equal to about two to eight times the amount of suspended matter in the incoming raw sewage.

The organic matter in the filter cake is destroyed by incineration. A rotary kiln incinerator consisting of two sections, namely, a drying section and a burning section is admirably adapted for the purpose. In both the dryer and incinerator sections of the unit, the air travels concurrently with the solids and gases. The dryer section is operated at a temperature which does not cause decomposition or carbonization of the sludge, and the incinerator section is operated at a temperature of about 650–700° C. This incinerating temperature is sufficiently high to destroy the putrescible matter. The incinerating temperature is preferably kept below 700° C. so that sintering of the residue is avoided. A substantial amount of the heat required for incinerating is obtained by the burning of the sludge. In fact, the calorific value of the sludge may be such that in a large scale operation no extraneous fuel is required for incineration.

The incinerated residue is again used in the process.

The single figure of the accompanying drawing is a diagrammatic flowsheet of a system adapted for carrying out the process of the invention.

The raw sewage is first passed through a coarse screen and then through a fine screen (not shown in the drawing) to remove coarse and heavy solid matter. The screened sewage is treated according to the process of the invention.

In the apparatus illustrated in the drawing, aeration of the sewage is carried out in a long tank or basin one end portion of which receives the incoming sewage and the other end portion of which discharges into a clarifier. Untreated returned sludge is added to the raw sewage as it enters the aeration basin and thorough mixing of the sludge and sewage is accomplished by air agitation. In this apparatus, the rate of flow of the sewage through the aeration basin is such as to give a detention period of about one hour. Ferric sulphate solution and incinerator ash are preferably added to the sewage in the aeration basin at a point corresponding to an interval of about 2 to 15 minutes before the time of discharge of the sewage into the clarifier, but provision is made for the addition of the ferric sulphate and incinerator ash at a number of points between the entrance end and the discharge end of the basin. The ferric sulphate and incinerator ash may be added to the sewage in the aeration vessel at one or more points during the course of flow of the sewage through the aeration vessel. If the addition of an alkaline agent is required or desired for adjustment of the pH of the sewage, milk of lime is added between the point of addition of the ferric sulphate and incinerator ash and the discharge end of the aeration vessel and spaced sufficiently from the point of addition of the ferric sulphate and incinerator ash to permit thorough dissemination of the ferric sulphate and incinerator ash in the sewage before the lime is added. Sodium nitrate, if employed, is preferably added to the sewage near the entrance end of the aeration vessel. A common air diffuser extends throughout the length of the aeration vessel and provides a source of air for aeration and agitation. The air diffuser may be of any suitable construction.

The clarifier illustrated in the drawing comprises a tank having a peripheral charging well 5 (extending approximately around one third of the circumference of the tank) and discharging into the bottom of the tank. Clarified liquor overflows in a launder 6 opposite the charging well and extending approximately around one-third of the upper circumference of the tank. A raking mechanism 7 moves sludge settling on the bottom of the tank towards the centrally positioned sludge discharge outlet. It is to be understood that other forms and types of clarifier may be used in practicing the invention. I have found that the introduction of the sewage near the bottom of a settling chamber beneath a settling mass of sludge therein materially aids in the production of a supernatant liquor substantially free from suspended matter.

Sludge from the clarifier is pumped by means of a pump 10 to a thickener having a sludge raking mechanism 8 and an overflow launder 9, or in part to the thickener and in part to the entrance end of the aeration vessel. The sludge pump 10 communicates with a conduit 11 which leads to a sludge return conduit 12. A by-pass conduit 13 is provided for conducting sludge from the pump 10 and conduit 11 to the thickener. Suitable valves are provided in the conduits 11 and 13 to control and distribute the flow of sludge therethrough. The clarifier and thickener effluents may be combined for appropriate disposal or for subsequent treatment, as for example by zeolite filters as described in the aforementioned patent to Gleason and Loonam, but the thickener effluent is preferably returned to the entrance end of the aeration vessel through a conduit 17 having a pump 18 included therein.

A portion of the sludge from the thickener may be conducted by means of a pump 14 and conduit 15 to the sludge return conduit 12 leading to the entrance end of the aeration vessel. The remainder of the sludge from the thickener is conducted through the conduit 16 to a suction filter. The filter-cake is conveyed to the dryer and incinerator. Suitable valves are provided in the conduits 15 and 16 to control and distribute the flow of sludge therethrough.

The filtrate or filter effluent is returned to the entrance end of the aeration vessel through a conduit 19 and the conduit 17. Suitable valves are provided in the conduits 17 and 19 to control the flow of thickened effluent and filtrate therethrough.

The sludge returned to the aeration vessel (20% to 75%, more or less) may be returned entirely either from the clarifier or from the thickener, or a portion may be returned from the clarifier and a portion from the thickener.

Both the dryer and incinerator are rotatably mounted cylinders in which the solid material and gases (for drying and incinerating) travel concurrently. Thus, the exhaust gas from the incinerator moves through the dryer concurrently with the sludge, and the dried sludge enters the incinerator along with hot gases from an oil burner or other heating means. An adequate amount of oxygen or other combustion supporting gas enters the incinerator (along with the hot gases of combustion of the extraneous fuel) to burn the organic and other combustible matter in the dried sludge. The incinerated residue or ash is discharged from the incinerator to a storage container from whence it is appropriately conveyed to points of introduction into the aeration vessel.

It will of course be understood that the apparatus illustrated in the drawing is merely illustrative and is not intended to be restrictive of the invention in any respect.

I claim:

In a sewage treatment process involving aeration of the sewage to coagulate putrescible matter therein, the improvement which comprises aerating the sewage in the presence of sodium nitrate.

JOHN G. BEVAN.